United States Patent
la Tendresse et al.

(10) Patent No.: US 8,022,818 B2
(45) Date of Patent: Sep. 20, 2011

(54) WARNING APPARATUS FOR A MOTOR VEHICLE

(75) Inventors: Ingo la Tendresse, Köln (DE); Holger Mueller, Köln (DE)

(73) Assignee: Ford Global Technologies, LLC, Dearborn, MI (US)

( * ) Notice: Subject to any disclaimer, the term of this patent is extended or adjusted under 35 U.S.C. 154(b) by 265 days.

(21) Appl. No.: 12/138,740

(22) Filed: Jun. 13, 2008

(65) Prior Publication Data

US 2008/0309515 A1 Dec. 18, 2008

(30) Foreign Application Priority Data

Jun. 15, 2007 (DE) .......................... 10 2007 027 529

(51) Int. Cl.
*B60Q 1/00* (2006.01)

(52) U.S. Cl. .... 340/435; 340/661; 340/565; 340/426.24

(58) Field of Classification Search .................. 340/435, 340/641, 660, 657, 661, 552, 541, 555, 556, 340/565, 566, 426.1, 426.24, 425.5, 426.13, 340/426.17

See application file for complete search history.

(56) References Cited

U.S. PATENT DOCUMENTS

| | | | | |
|---|---|---|---|---|
| 5,517,196 A | * | 5/1996 | Pakett et al. | 342/70 |
| 5,949,331 A | * | 9/1999 | Schofield et al. | 340/461 |
| 6,198,409 B1 | * | 3/2001 | Schofield et al. | 340/903 |
| 6,424,273 B1 | * | 7/2002 | Gutta et al. | 340/937 |
| 6,636,258 B2 | * | 10/2003 | Strumolo | 348/149 |
| 6,753,766 B2 | * | 6/2004 | Patchell | 340/436 |
| 6,812,833 B2 | * | 11/2004 | Rothkop et al. | 340/475 |
| 6,859,148 B2 | | 2/2005 | Miller et al. | |
| 6,933,837 B2 | * | 8/2005 | Gunderson et al. | 340/436 |
| 7,085,633 B2 | * | 8/2006 | Nishira et al. | 701/36 |
| 7,205,904 B2 | * | 4/2007 | Schofield | 340/903 |
| 7,355,524 B2 | * | 4/2008 | Schofield | 340/903 |
| 7,634,341 B2 | * | 12/2009 | Patchell | 701/45 |
| 2006/0006988 A1 | * | 1/2006 | Harter et al. | 340/435 |

FOREIGN PATENT DOCUMENTS

EP 1450330 3/2006

* cited by examiner

*Primary Examiner* — Daniel Previl
(74) *Attorney, Agent, or Firm* — Frank A. MacKenzie; Brooks Kushman P.C.

(57) ABSTRACT

Warning apparatus (2) for a motor vehicle (1) having an indicator system (6) for indicating a change of lane comprising at least one signal display (7) arranged in the field of view of the driver and having a sensor system for detecting obstacles in the blind spot (4), wherein the sensor system generates a warning signal in the event of detection of an obstacle, wherein the signal display (7) of the indicator system (6) is connected to the sensor system such that the warning signal is reproduced in visual form via the signal display (7).

12 Claims, 2 Drawing Sheets

WARNING APPARATUS FOR A MOTOR VEHICLE

FIELD OF THE INVENTION

The invention relates to a warning apparatus for a motor vehicle having an indicator system for indicating a change of lane comprising at least one signal display arranged in the field of view of the driver and having a sensor system for detecting obstacles in the blind spot, wherein the sensor system generates a warning signal in the event of detection of an obstacle.

BACKGROUND OF THE INVENTION

Monitoring of the blind spot is an important and difficult task for drivers of a motor vehicle in order to prevent accidents. The blind spot is the area to the side of and behind motor vehicles which the driver cannot be easily see by means of the sideview and rearview mirrors or without significant body movements.

This blind spot area varies in size depending on the number of windows and rearview mirrors and cannot be completely eliminated. One particular problem is the blind angle in the case of trucks, buses and motorcycles since these only have a restricted radius of view due to the size and design. The size of the blind angle is given as 38% in the case of the current status of the legal regulations.

The blind spot prevents or impairs the reactions of the driver to events. This becomes particularly apparent in the case of cycle paths on the right side of the road and turning trucks. In the case of an accident, drivers almost always report that they did not see the cyclist due to the blind angle. It is also impossible to react to errors made by others in the blind angle, as a result of which accidents also occur.

A variety of technical apparatuses have been previously known in order to facilitate or enable monitoring of the blind spot.

U.S. Pat. No. 6,859,148 discloses a warning apparatus in which the proximity of a second vehicle is detected by means of a camera and corresponding intelligence and is reproduced via a visual or acoustic indication. This system, however, involves dedicated displays such that the driver must train his attention in a particular manner for this purpose. Moreover, the acoustic warning has the disadvantage that it is not equally suitable in all driving situations and in the case of all drivers and cannot indicate the direction in which the detected vehicle lies.

U.S. Pat. No. 6,812,833 discloses a further warning apparatus in which the turn indicator control of the turn indicator system vibrates after detection of an obstacle or vehicle in the monitored area. This apparatus is, however, relatively complex and can only warn the driver when he leaves his or her hand on the turn indicator control for a sufficiently long time.

EP 1 450 330 A1 discloses a warning apparatus in which, after detection of an obstacle which must, however, be visible in one of the vehicle mirrors, a signal is generated which indicates the corresponding mirror. In this case, the display of the signal is preferably in the mirror itself. The blind spot can only be insufficiently monitored with this apparatus since the identified or detected obstacle must be visible in the mirror. Alternatively, the use of a dedicated display is provided which indicates the direction in which the obstacle lies by means of directional arrows.

SUMMARY OF THE INVENTION

Against this background, the object of the present invention is to provide a warning apparatus for a motor vehicle which enables in a simple manner monitoring of the blind spot and is also of simple design and can be used by the driver without major changes to normal driving habits.

Due to the fact that the signal display of the indicator system is connected to the sensor system such that the warning signal is reproduced in visual form via the signal display, it is possible to warn the driver in a psychologically advantageous manner with simple means which are already present since the easy-to-understand indicator displays are arranged in the prominent field of view in practically all vehicles due to their importance and to which the driver already pays particular attention as a result of normal habits. The driver therefore does not have to learn any new system or further dedicated warning displays or become accustomed to them.

It is advantageous if the signal display of the indicator system has separate areas for the separate display of a left and a right lane change. The direction in which the obstacle detected in the blind spot lies can then be indicated via the targeted actuation of the corresponding area. To this end, the separate areas of the signal display of the indicator system can be connected to the sensor system in such a manner that the area which corresponds to the direction of the detected obstacle is actuated.

It is furthermore possible that the signal display is configured with an illumination means for reproducing the warning signal in a color which differs from normal practice. The display of the indicator system thus normally illuminates in green. The warning signal color would then appear different from this, e.g. in red or yellow, etc. This can be achieved in a simple manner e.g. via two-color LEDs.

In order to improve visual alertness in the event of a warning, it may be expedient if the signal display flashes in a rapid sequence. The signal display can therefore be configured in an actuable manner such that the visual warning signal is reproduced in intervals.

In order to support the visual warning, an acoustic signal such as a warning tone, a speech output, etc. can additionally be provided. The signal display can therefore be configured with a means for acoustic support of the visual reproduction.

The visual signal can nevertheless not only be generated by a color difference, but rather it is also possible to additionally or alternatively vary the brightness of the display. The signal display can therefore be configured with an illumination means for reproducing the warning signal in a brightness which varies from normal practice. This is advantageous particularly in darkness and can correspondingly be activated automatically e.g. at night or in tunnels.

The signal display is advantageously configured in an actuable manner such that the visual warning signal is reproduced in different interval sequences and/or in different light intensities, as a function of the position of and/or the distance to the obstacle.

In one advantageous embodiment, the warning apparatus encompasses a sound generation apparatus which generates an audible signal in addition to the visual warning signal. The signal display is thus fitted with a means for acoustic support of the visual reproduction. The audible signal can be a standard warning tone such as is used in the vehicle for many functions, e.g. indicator sound, safety belt detection, door locking, etc., it can also be provided by means of a speech output as a linguistic warning message or as a warning tone.

The visual warning signal and the audible signal are advantageously generated in the same interval or with the same light intensity and volume or audio frequency, i.e. both signals appear and sound simultaneously in the same rhythm or the audible signal is quiet and/or of low-frequency in the case of a dimly illuminating warning signal. If the warning signal illuminates brightly, the audible signal sounds loudly and/or at a high frequency. The attention of the driver is thus drawn even more strongly to the warning signals.

In a further embodiment, the visual warning signal and audible signal are generated with different intervals or with a different light intensity, and volume and audio frequency. This may be expedient if specific conditions between the obstacle and vehicle should be displayed. In this case, can occur entirely differently in the relationship between warning signal and audible signal, i.e. the warning signal becomes bright or dim, the audible signal loud or quiet, low-frequency or high-frequency, and/or warning signal and audible signal have different intervals of occurrence. The position of the obstacle relative to the vehicle can then be displayed by specific combinations of these signals.

The change in the light intensity of the warning signal can either be a bright or dim illumination or a change in color of the warning signal, e.g. going from green via yellow to red if the obstacle is close. The change in light intensity of the warning signal can also be a combination of a change in brightness and change in color.

In the case of some indicator systems, it may be expedient for technical reasons if the warning apparatus surrounds or encompasses the normal display around the edge. The signal display can therefore be fitted with an illumination means for reproducing the warning signal, the illumination means at least partially surrounding the area for normal use.

The warning apparatus can also be used entirely or partially with a lane change assistant for monitoring the extended, rear area of the motor vehicle. In this case, the lane change assistant can be partially or entirely connected to the sensor system which then detects the extended, rear area behind the vehicle.

BRIEF DESCRIPTION OF THE DRAWINGS

Further advantages and details of the invention will become apparent from the following description of exemplary embodiments with reference to the drawing, in which.

DETAILED DESCRIPTION OF PREFERRED EMBODIMENTS

Figure 1:
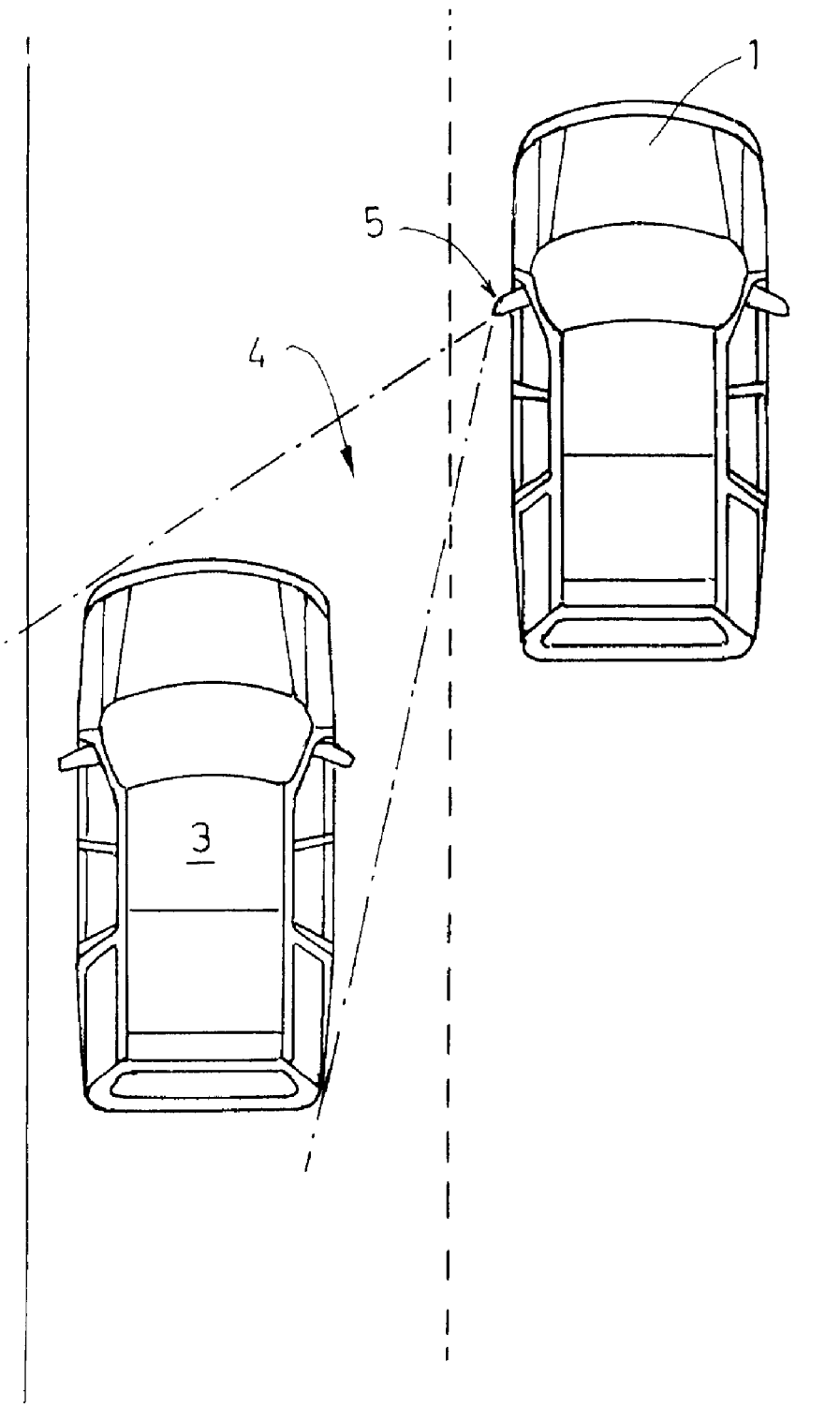
FIG. 1 shows a schematic overview to illustrate the blind spot.

FIG. 1 illustrates by way of example a vehicle 1 which is provided with a warning apparatus 2 which informs or warns the driver of the vehicle when a second vehicle 3 enters into blind spot 4.

Blind spot 4 is the area into which sideview mirror 5 does not allow a view without the movement of the driver. Blind spot 4 can be of various forms and sizes depending on the vehicle, mirror configuration, etc.

Various embodiments of warning apparatus 2 are represented in the further figures. These embodiments are discussed below jointly with reference to identical reference numbers, with the differences being discussed in detail.

Vehicle 1 provided with a warning apparatus 2 comprises in each case an indicator system 6 for displaying a lane change, indicator system 6 having a signal display 7 arranged in the field of view of the driver.

In the present case, signal display 6 is arranged in a prominent position in central instrument panel 8 of the dashboard of the vehicle between speedometer 9 and revolution counter 10 and above a further display panel 11.

Warning apparatus 2 furthermore encompasses a sensor system, not shown, for the detection of obstacles or other vehicles in blind spot 4. The sensor system can use any type of sensor which is suitable for detecting in a reliable manner the approach or the entry of a vehicle into blind spot 4. In this case, this can involve e.g. ultrasound sensors, cameras or lasers or infrared sensors, etc.

The sensor system is provided with a control unit which actuates signal display 7 of indicator system 6 in the event of detection of obstacle 3 in order to produce a visual warning signal via signal display 6.

Figure 2:
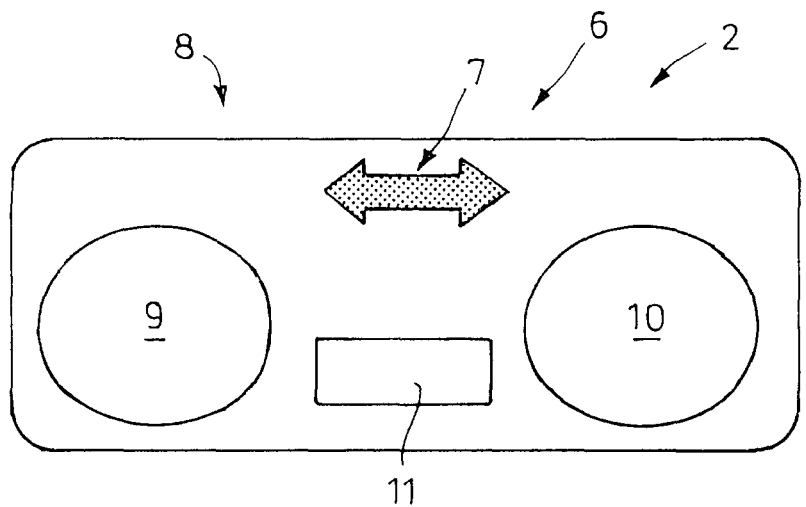
FIG. 2 shows a schematic view of one embodiment of the invention.

In the embodiment shown in FIG. 2, display 7 comprises a single area that may be actuated in order to illuminate in either of two different colors. To this end, display 7 has an illumination means which comprises a two-color LED. Display 7 is illuminated in a first of the two available colors in response to activation by the driver of the vehicle turn indicators, and is illuminated in a second color is response to detection by the sensor system of an obstacle in a blind spot 4 on either side of the vehicle.

Figure 3:
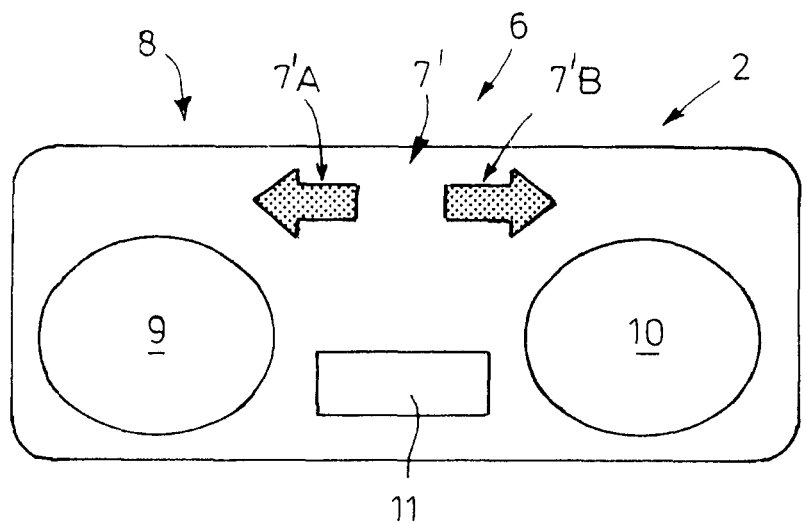
FIG. 3 shows a schematic view of a further embodiment of the invention.

In the embodiment shown in FIG. 3, display 7' already has comprises, in contrast, two separate areas 7'A, B for the separate display of a left and right lane change. These are therefore used to give the driver additional information indicating the direction (left or right) in which the blind spot 4 lies in which vehicle 3 was discovered.

In the example shown in FIG. 1, left area 7'A of display 7' of indicator system 6 of the embodiment shown in FIG. 3 would therefore be actuated.

Signal display 7' of the embodiment shown in FIG. 3 preferably has the addition feature that the control unit brings about a flashing of the display and, in addition, an audible warning tone in the form of a "gong" is output.

Figure 4:
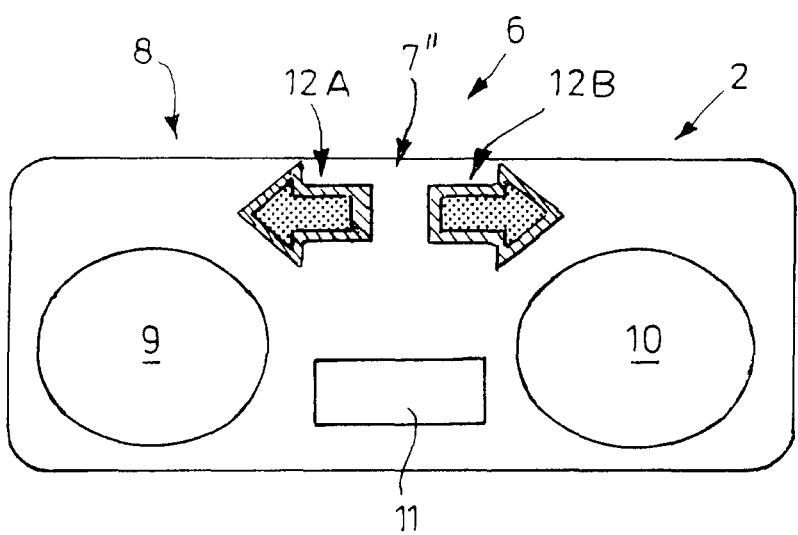
FIG. 4 shows a schematic view of a further embodiment of the invention.

In the embodiment shown in FIG. 4, display 7" also has, as just discussed, two separate areas 7"A, B for the separate display of a left and right lane change. However, these areas 7"A, B are in each case surrounded by an additional visual display area 12A, B which can be actuated separately from areas 7"A, B for the lane change display.

Actuation is thus performed in an analogous manner to the example from FIG. 3 with the difference that the driver is warned via display area 12A, B. In this embodiment, it is also possible to actuate display areas 7"A, B and 12A, B to improve the effect alternatively to illumination.

The invention claimed is:

1. A warning apparatus for a motor vehicle, the vehicle having an indicator system for indicating a turn indicator is activated and comprising at least one signal display located in a central instrument panel of the vehicle, and the vehicle further having a sensor system for detecting obstacles in a blind spot of the vehicle and generating a warning signal in response thereto, wherein the signal display provides a first visual indication that the turn indicator is activated in the absence of the warning signal, and the signal display produces a second visual indication that the warning signal has been generated.

2. A warning apparatus for a motor vehicle comprising:
   a sensor system detecting obstacles in a blind spot of the vehicle and generating a warning signal when an obstacle is detected; and
   a signal display located in a central instrument panel of the vehicle and producing a visual indication that a turn indicator has been activated in the absence of the warning signal, the signal display connected to the sensor system and producing a visual warning indication in response to the warning signal.

3. The warning apparatus as claimed in claim 2, wherein the signal display comprises separate areas for displaying a left and right lane change and the separate areas produce visual indications corresponding to the direction of the detected obstacle.

4. The warning apparatus as claimed in claim 2, wherein the signal display produces the warning signal in a first color and the visual indication of turn signal activation in a second color.

5. The warning apparatus as claimed in claim 2, wherein the signal display produces the visual warning signal in intervals.

6. The warning apparatus as claimed in claim 2, wherein the signal display produces the visual warning signal in different interval sequences, as a function of the position of and/or the distance to the obstacle.

7. The warning apparatus as claimed in claim 2, wherein the signal display produces the visual warning signal in different light intensities, as a function of the position of and/or the distance to the obstacle.

8. The warning apparatus as claimed in claim 2, further comprising a sound generation apparatus generating an audible signal in addition to the visual warning signal.

9. The warning apparatus as claimed in claim 8, wherein the visual warning signal and audible signal are generated in the same interval or with the same light intensity and volume or audio frequency.

10. The warning apparatus as claimed in claim 8, wherein the visual warning signal and audible signal are generated with different intervals or with a different light intensity and volume or pitch.

11. The warning apparatus as claimed in claim 2, wherein the signal display illuminates at a first brightness level to produce the warning signal and illuminates at a second brightness lever to produce the visual indication of turn signal activation.

12. The warning apparatus as claimed in claim 2, wherein the signal display a first area of illumination for producing the visual indication of turn indicator activation and a second area of illumination at least partially surrounding the first area for producing the visual warning signal.

* * * * *